United States Patent
White et al.

(10) Patent No.: US 9,624,380 B2
(45) Date of Patent: Apr. 18, 2017

(54) SULFIDE EXTENDED EPOXY RESINS AND BARRIER COATING APPLICATIONS THEREOF

(71) Applicant: SUN CHEMICAL CORPORATION, Parsippany, NJ (US)

(72) Inventors: Michael White, Ridgefield, CT (US); Josie Rosen, Monroe, NY (US); Philippe Schottland, Sparta, NJ (US); Ralph Arcurio, Bridgewater, NJ (US)

(73) Assignee: Sun Chemical Corporation, Parsippany, NJ (US)

( * ) Notice: Subject to any disclaimer, the term of this patent is extended or adjusted under 35 U.S.C. 154(b) by 32 days.

(21) Appl. No.: 14/364,820

(22) PCT Filed: Dec. 14, 2012

(86) PCT No.: PCT/US2012/069718
§ 371 (c)(1),
(2) Date: Jun. 12, 2014

(87) PCT Pub. No.: WO2013/090702
PCT Pub. Date: Jun. 20, 2013

(65) Prior Publication Data
US 2014/0342091 A1 Nov. 20, 2014

Related U.S. Application Data

(60) Provisional application No. 61/576,055, filed on Dec. 15, 2011.

(51) Int. Cl.
| | | |
|---|---|---|
| *C09D 5/00* | (2006.01) | |
| *C08G 59/30* | (2006.01) | |
| *C09D 163/00* | (2006.01) | |
| *C08G 59/32* | (2006.01) | |
| *B05D 3/00* | (2006.01) | |

(52) U.S. Cl.
CPC .............. *C09D 5/00* (2013.01); *B05D 3/007* (2013.01); *C08G 59/302* (2013.01); *C08G 59/3263* (2013.01); *C09D 163/00* (2013.01)

(58) Field of Classification Search
None
See application file for complete search history.

(56) References Cited

U.S. PATENT DOCUMENTS

| | | | | |
|---|---|---|---|---|
| 3,801,676 A * | 4/1974 | Hickner | ................ | C07C 321/00 204/157.76 |
| 3,968,167 A * | 7/1976 | Hickner | ................ | C07C 323/00 528/107 |
| 5,643,657 A * | 7/1997 | Dueber | .................... | G03F 7/00 428/195.1 |
| 2003/0008950 A1 * | 1/2003 | Chawla | .................... | C08F 2/46 524/83 |
| 2007/0104937 A1 * | 5/2007 | Kamae | ................ | C08G 59/18 428/297.4 |
| 2010/0009293 A1 * | 1/2010 | Yao | .................... | C08G 59/3236 430/312 |
| 2011/0011533 A1 * | 1/2011 | Golden | .............. | C08G 59/1466 156/330 |

FOREIGN PATENT DOCUMENTS

| | | | |
|---|---|---|---|
| DE | 232057 | * | 1/1986 |
| JP | 2011-042620 A | | 3/2011 |
| WO | 00/22025 A1 | | 4/2000 |
| WO | 2011/008295 A1 | | 1/2011 |

OTHER PUBLICATIONS

Translation of DD 232057, Jan. 1986.*
Caplus and wpix abstracts of DD 232057, Jan. 1986.*
CAS RN 540-63-6, Nov. 1984.*
Notification Concerning Transmittal of International Preliminary Report on Patentability (Chapter 1 of the PCT), issued in parent PCT application No. PCT/US2012/069718, dated Jun. 26, 2014.
Chinese Office Action with English language translation, issued in counterpart Chinese application No. 201280062120.3 dated Oct. 9, 2015.
International Search Report mailed Feb. 10, 2013 in connection with International Application No. PCT/US2012/069718, filed Dec. 14, 2012.
Chinese Office Action issued in counterpart application No. 201280062120.3 date of issue Jul. 26, 2016 with an English language translation thereof.

* cited by examiner

*Primary Examiner* — Erma Cameron
(74) *Attorney, Agent, or Firm* — Charles C. Achkar; Ostrolenk Faber LLP

(57) ABSTRACT

Provided is an oxygen barrier coating composition includes a resin including a compound of the following formula: where R1 is an alkyl, cycloalkyl, aryl, alkyl aryl, glycol or polyol group, where the alkyl, cycloalkyl, aryl, alkyl aryl, glycol or polyol group is substituted with one or more glycidyl groups, the alkyl group of R1 is further substituted with one or more OH, cycloalkyl, aryl, heteroaryl or glycidyl ethers or combinations thereof, and the cycloalkyl, aryl, alkyl aryl, glycol or polyol group of R1 optionally is substituted with one or more alkyl, OH, cycloalkyl, aryl, heteroaryl or glycidyl ethers or combinations thereof, and R2 is an alkyl, cycloalkyl, aryl or heteroaryl group, where the alkyl, cycloalkyl, aryl or heteroaryl group is substituted with one or more mercapto groups, and the aryl, alkyl aryl, alkyl, cycloalkyl or heteroaryl group optionally is substituted with one or more alkyl, OH, cycloalkyl, aryl, heteroaryl or glycidyl ethers or combinations thereof. Also provided are methods of reducing the transmission rate of a gas through a substrate, the method including applying the gas barrier coating composition provided herein on the substrate and drying the gas barrier coating composition.

22 Claims, No Drawings

SULFIDE EXTENDED EPOXY RESINS AND BARRIER COATING APPLICATIONS THEREOF

The present application is a §371 National Phase application based on PCT/US2012/069718 filed Dec. 14, 2012, which claims the benefit of the U.S. Provisional Application No. 61/576,055, filed on Dec. 15, 2011, the subject matter of each of which is incorporated by reference in its entirety, where permitted.

BACKGROUND OF THE INVENTION

Field of the Invention

The present invention relates to an oxygen barrier coating composition and a method of preparing the oxygen barrier coating composition.

Discussion of the Related Art

Two types of polymers are currently known to give good oxygen barrier coatings. They are chlorinated polymers and poly (vinyl alcohol) (PVA) or ethylene/vinyl alcohol copolymers (EVOH). Chlorinated polymers, such as polyvinylidene chloride (PVDC), are under increasing regulatory pressure, especially when it is necessary to incinerate films made from chlorinated polymers for disposal. Thus it would be desirable to replace chlorinated polymers with non-chlorinated polymers. Polymers and nano-composites based on PVA or EVOH give oxygen barrier properties at low relative humidity, but exhibit high oxygen transmission rates at relative humidity higher than 75%. This deficiency has limited the effectiveness in climates such as those found in the southern United States.

There are currently no commercially available, high speed in-line of printable or coatable, non-chlorinated, one component transparent barrier coatings that give good oxygen barrier—especially above 75% relative humidity. There is need to develop coating compositions that have excellent oxygen barrier properties at relative humidity higher than 75% and do not have significant concentrations of bound chloride. These resins enable solvent-borne coatings, which can be printed, for example, at high speed on a gravure or flexo press or even using the coating station of a laminator.

SUMMARY OF THE INVENTION

In one application of the present invention, provided is a gas barrier coating, particularly an oxygen barrier coating composition that includes a resin containing at least one β-hydroxysulfide moiety (or β-hydroxythioether linkage) within the resin. The β-hydroxythioether linkage can be formed by reacting a multifunctional glycidyl ether with a multifunctional mercapto compound to obtain a resin containing a moiety represented by the following formula:

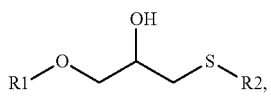

where R1 is an optionally substituted alkyl, cycloalkyl, aryl, alkyl aryl, glycol or polyol group and R2 is an optionally substituted aryl, alkyl aryl, alkyl, cycloalkyl or heteroaryl group. In R1 the alkyl group optionally can be substituted with one or more OH, cycloalkyl, aryl, heteroaryl or glycidyl ethers or combinations thereof. In R1 the cycloalkyl, aryl, alkyl aryl, glycol or polyol group optionally can be substituted with one or more alkyl, OH, cycloalkyl, aryl, heteroaryl or glycidyl ethers or combinations thereof. In R2 the aryl, alkyl aryl, alkyl, cycloalkyl or heteroaryl group optionally can be substituted with one or more alkyl, OH, cycloalkyl, aryl, heteroaryl or glycidyl ethers or combinations thereof.

The multifunctional glycidyl ether used to form the β-hydroxythioether linkage of the resin can be any multifunctional aromatic or cycloaliphatic glycidyl ether represented by the following structure:

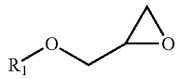

where R1 is an optionally substituted alkyl, cycloalkyl, alkyl aryl or aryl group. The optionally substituted alkyl, cycloalkyl, alkyl aryl and aryl group can be substituted with one or more glycidyl ethers. For example, the aryl, alkyl aryl or cycloalkyl group can be substituted with between 2 and 15 glycidyl ethers, such as between 2 and 10 glycidyl ethers, or 2 and 5 glycidyl ethers. The optionally substituted aryl group or cycloalkyl group can be substituted with 2, 3, 4, 5, 6, 7, 8, 9, 10, 11, 12, 13, 14 or 15 glycidyl ethers. Any of glycidyl ether substituents of R1 can react with mercapto substituents of R2 to form one or more β-hydroxysulfide moieties. When so substituted, any glycidyl ether substituent on the alkyl, cycloalkyl, aryl, alkyl aryl, glycol or polyol substituents of R1 can react with a mercapto group. In some instances, the end group of the R1 substituent includes a mercapto group. Upon an oxidative post treatment, such mercapto functional groups could be partially or totally converted into disulfide groups.

The multifunctional mercapto compound used to form the β-hydroxythioether linkage in the resin can be any multifunctional mercapto compound represented by the following structure:

where R2 is an optionally substituted alkyl, a cycloalkyl, aryl, alkyl aryl or a heteroaryl group. The optionally substituted alkyl, cycloalkyl, aryl, alkyl aryl and heteroaryl group can be substituted with one or more mercapto groups. For example, the aryl, alkyl aryl, alkyl, cycloalkyl or heteroaryl group can be substituted with between 2 and 16 mercapto groups, such as between 2 and 10 mercapto groups, or 2 and 5 mercapto groups. The optionally substituted aryl, alkyl aryl, alkyl, cycloalkyl, or heteroaryl group can be substituted with 2, 3, 4, 5, 6, 7, 8, 9, 10, 11, 12, 13, 14, 15 or 16 mercapto groups. The mercapto substituents of R2 and the glycidyl ether substituents of R1 can further form one or more β-hydroxysulfide moieties. When so substituted, any glycidyl ether substituent on the alkyl, cycloalkyl, aryl, alkyl aryl or heteroaryl substituents of R2 can react with a mercapto group. In some instances, the end group of the R2 substituent includes a mercapto group. Upon an oxidative post treatment, such mercapto functional groups could be partially or totally converted into disulfide groups.

In some applications of the present invention, R1 is an aryl group substituted with 1 to 14 glycidyl ethers.

In some applications of the present invention, R2 is an aryl group or alkyl aryl group or a heteroaryl group, the aryl, alkyl aryl and heteroaryl groups being substituted with 1 to 15 mercapto groups.

In some applications of the present invention, the dried gas barrier coating has a gas transmission rate of less than 50 cc/m²-day at a relative humidity of 50% or more. In some applications, the gas barrier coating is an oxygen barrier coating composition that when dried has an oxygen transmission rate of between about 0.05 cc/m²-day to about 50 cc/m²-day at a relative humidity of 50% or more.

In some applications of the present invention, the oxygen transmission rate of the dried coating is between about 0.5 cc/m²-day to about 25 cc/m²-day at a relative humidity of 50% or more.

In some applications of the present invention, the oxygen transmission rate of the dried coating is between about 1 cc/m²-day to about 15 cc/m²-day at a relative humidity of 50% or more.

In some applications of the present invention, the use environment of the gas barrier coating has a relative humidity is 75%.

In some applications of the present invention, the oxygen barrier coating composition has a coating weight of less than about 2 grams per square meter.

In some applications of the present invention, the gas barrier coating is an oxygen barrier coating composition that has an oxygen transmission rate of less than about 35 cc/m²-day at a relative humidity of 75% at a coating weight of less than about 2 grams per square meter.

In some applications of the present invention, the oxygen barrier coating composition has an oxygen transmission rate of less than about 10 cc/m²-day at a relative humidity of 75% at a coating weight of less than about 2 grams per square meter.

In some applications of the present invention, the β-hydroxy-thioether linkage is a reaction product of a multifunctional glycidyl ether and a multifunctional mercapto compound.

In some applications of the present invention, the multifunctional glycidyl ether is selected from among 1-phenyl-1,2-ethanediol diglycidyl ether, 1,2-benzenediol diglycidyl ether (pyrocatechol diglycidyl ether), 1,3-benzenediol diglycidyl ether (resorcinol diglycidyl ether), 1,4-benzenediol diglycidyl ether, methyl catechol diglycidyl ether, triglycidyl-p-aminophenol, diglycidyl 1,2-cyclohexane-dicarboxylate, methyl resorcinol diglycidyl ether, 1,2,4-benzenetriol triglycidyl ether, 2-hydroxybenzylalcohol diglycidyl ether, 3-hydroxybenzylalcohol diglycidyl ether, diglycidyl phthaloyl diester, diglycidyl terephthaloyl diester, diglycidyl isophthaloyl diester, 3,4-epoxycyclohexylmethyl-3,4-epoxycyclohexane carboxylate, tris(2,3-epoxypropyl)isocyanurate, tetraphenylolethane glycidyl ether, Tetrad-X, meta-xylylenetetraglycidyl amine, 4,4'-methylenebis(N,N-diglycidylaniline), 4-hydroxybenzylalcohol diglycidyl ether, 1,4-cyclohexanedimethanol-diglycidyl ether, mix of cis/trans, 3,5-dihydroxy-benzylalcohol diglycidyl ether, Novolac Epoxy Resins, 1,2-benzenedimethanol diglycidyl ether, 1,3-benzenedimethanol diglycidyl ether, 1,4-benzenedimethanol diglycidyl ether, tris(4-hydroxyphenyl)methane triglycidyl ether, 2-(2-hydroxyphenyl)-ethanol diglycidyl ether, 2-(3-hydroxy-phenyl)-ethanol diglycidyl ether, 2-(4-hydroxy-phenyl)ethanol diglycidyl ether, 2-phenyl-1,2-propanediol diglycidyl ether, propylene glycol diglycidyl ether, PEG diglycidyl ether and biphenyl-4,4'-diglycidyl ether.

In some applications of the present invention, the multifunctional mercapto compound is selected from among 2,5-dimercapto-1,3,4-thiadiazole, alkyl 2,5-dimercapto-1,3,4-thiadiazole, 5,5-dithiobis(1,3,4-thiadiazole-2(3H)-thione, 2-amino-5-mercapto-1,3,4-thiadiazole, 2-mercapto-5-methylthio-1,3,4-thiadiazole, 5-methyl-1,3,4-thiadiazole-2-thiol, dimercaptothiadiazole dimer, 1-methyl, 2,3-dimercaptobenzene, 1,2-dimercaptoethane, trimethylolpropane trithioglycolate, pentaerythritol tetrathioglycolate, dipentaerythritol hexathioglycolate, 1,2-ethanedithiol, 1,2-propanedithiol, 1,3-propanedithiol, 1,10-decanedithiol, dipentene dimercaptan, ethylcyclohexyl dimercaptan, 1,4-benzenedithiol, 1,3-benzenedithiol, and 1,2-benzenedithiol.

In some applications of the present invention, the oxygen barrier coating composition further includes a colorant, fillers, and extenders.

In some applications of the present invention, the oxygen barrier coating composition is applied to a package for food, pharmaceuticals or cosmetics.

Also provided is a method of reducing the oxygen transmission rate of a substrate, the method including applying the oxygen barrier coating composition described herein on a substrate and drying the oxygen barrier coating composition. The method can include as a step measuring the oxygen transmission rate of the oxygen barrier coating composition dried on the substrate.

Also provided is a method of preparing an oxygen barrier coating composition that includes providing a resin that includes a moiety represented by the following formula:

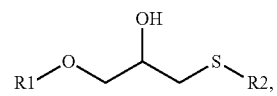

wherein R1 is an optionally substituted alkyl, cycloalkyl, aryl, alkyl aryl, glycol or polyol group substituted with one or more glycidyl groups, where the alkyl group optionally can be substituted with one or more OH, cycloalkyl, aryl, heteroaryl or glycidyl ethers or combinations thereof and the cycloalkyl, aryl, alkyl aryl, glycol or polyol group optionally can be substituted with one or more alkyl, OH, cycloalkyl, aryl, heteroaryl or glycidyl ethers or combinations thereof, and where R2 is an alkyl, cycloalkyl, aryl, alkyl aryl, or heteroaryl substituted with one or more mercapto groups, where the aryl, alkyl aryl, alkyl, cycloalkyl or heteroaryl group optionally can be substituted with one or more alkyl, OH, cycloalkyl, aryl, heteroaryl or glycidyl ethers or combinations thereof, where the glycidyl ether substituents of R1 and the mercapto substituents of R2 can further form one or more β-hydroxysulfide moieties; applying the resin to a substrate; and drying the resin to obtain the oxygen barrier coating composition. The methods of preparing an oxygen barrier coating composition further can include providing a mixture of a colorant, fillers, and extenders and adding the mixture to the resin.

It is to be understood that both the foregoing general description and the following detailed description as well as drawings are exemplary and explanatory and are intended to provide further explanation of the invention as claimed.

DETAILED DESCRIPTION OF THE ILLUSTRATED EMBODIMENTS

Examples of epoxy resins useful as oxygen barrier coatings are known in the art. For example, epoxy resins based on resorcinol diglycidyl ether (RDGE) are known. RDGE can form two-component systems with amines.

There are relatively few examples of mercapto compounds, for example, dimercaptothiadiazole (DMTD), being reacted with diglycidyl ethers. JP2011042620 (2010) discloses the reaction of 1,6-hexanediol diglycidyl ether with DMTD as a surface treatment compound. U.S. Pat. No. 5,274,102 (1993) describes the reaction product of glycidyl methylate with DMTD as part of a laundry list of lubricant compositions. The reaction of mercapto compound with aromatic or cycloaliphatic multifunctional epoxides, including, for examples, bisphenol A diglycidyl ether, bisphenol F diglycidyl ether, and resorcinol diglycidyl ether, is of interest.

The inventors have found that gas barrier coating compositions, particularly oxygen barrier coating compositions, that include resins based on multifunctional aromatic glycidyl ethers and multifunctional mercapto compounds, for example, resorcinol diglycidyl ether and dimercaptothiadiazole, can form films that give up to 7 times lower oxygen transmission rates than EVOH at 75% relative humidity without the bound chlorine present in PVDC.

In one application, an oxygen barrier coating composition a resin, and the resin includes a moiety represented by the following formula 1:

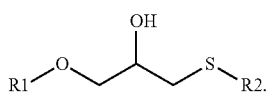

Formula 1

In formula 1, R1 is an optionally substituted alkyl, cycloalkyl, aryl, alkyl aryl, glycol or polyol group and the alkyl, cycloalkyl, aryl, alkyl aryl, glycol or polyol group of R1 is substituted with one or more glycidyl ethers. Preferably, the alkyl, cycloalkyl, aryl, alkyl aryl, glycol or polyol group of R1 is substituted with 1, 2, 3, 4, 5, 6, 7, 8, 9, 10, 11, 12, 13, 14, or 15 glycidyl ethers. In R1 the alkyl group optionally also can be substituted with one or more OH, cycloalkyl, aryl, heteroaryl or glycidyl ethers or combinations thereof. In R1 the cycloalkyl, aryl, alkyl aryl, glycol or polyol group optionally can be substituted with one or more alkyl, OH, cycloalkyl, aryl, heteroaryl or glycidyl ethers or combinations thereof. Any of glycidyl ether substituents of R1 can react with mercapto substituents of R2 to form one or more β-hydroxysulfide moieties. Any glycidyl ether substituent on the alkyl, cycloalkyl, aryl, alkyl aryl, glycol or polyol sub stituents of R1 can react with a mercapto group. In some instances, the end group of the R1 substituent includes a mercapto group. Upon an oxidative post treatment, such mercapto functional groups could be partially or totally converted into disulfide groups.

In formula 1, R2 is an optionally substituted alkyl, cycloalkyl, aryl, alkyl aryl or heteroaryl group, and the alkyl, cycloalkyl, aryl, alkyl aryl or heteroaryl group of R2 is substituted with one or more mercapto groups. Preferably, the alkyl, cycloalkyl, aryl, alkyl aryl or heteroaryl group of R2 is substituted with 1, 2, 3, 4, 5, 6, 7, 8, 9, 10, 11, 12, 13, 14, 15, or 16 mercapto groups. In R2 the aryl, alkyl aryl, alkyl, cycloalkyl or heteroaryl group optionally also can be substituted with one or more alkyl, OH, cycloalkyl, aryl, heteroaryl or glycidyl ethers or combinations thereof. The glycidyl ether substituents of R1 and the mercapto substituents of R2 can further form one or more β-hydroxysulfide moieties. Any glycidyl ether substituent on the alkyl, cycloalkyl, aryl, alkyl aryl or heteroaryl substituents of R2 can react with a mercapto group. In some instances, the end group of the R2 substituent includes a mercapto group. Upon an oxidative post treatment, such mercapto functional groups could be partially or totally converted into disulfide groups.

The gas barrier coating compositions provided herein can be halogen-free. In some applications, the gas barrier coating compositions provided herein can include other polymers. In some applications, the gas barrier coating compositions provided herein can exclude polymers, such as poly (vinyl alcohol) (PVA) or ethylene/vinyl alcohol copolymers (EVOH), poly(methacrylic acid (PMAA) or chlorinated polymers, such as polyvinylidene chloride (PVDC).

The gas barrier coating compositions provided herein can be used to reduce transmission of a gas by producing a film by drying the gas barrier coating compositions provided herein. Exemplary gases whose transmission can be reduced include oxygen, nitrogen and carbon dioxide. The gas barrier coating compositions provided herein can be used to keep gases from entering a package containing the gas barrier coating compositions. In some applications, the gas barrier coating composition can be applied to the inside or a packaging material or the outside of a packaging material or both. In some applications, the gas barrier coating composition can be applied to retain gases, e.g., nitrogen, inside the package to minimize oxidation or staling. In some applications, the gas barrier coating composition can be applied to retain aromas. Other applications include applying the gas barrier coating composition to the outside surface of a package, such as to minimize entry of oxygen into the package.

As used herein, alkyl refers to straight or branched chain hydrocarbyl groups having from 1 up to about 100 carbon atoms.

As used herein, cycloalkyl refers to cyclic (i.e., ring-containing) alkyl moieties typically containing in the range of about 3 up to about 50 carbon atoms.

As used herein, aryl refers to aromatic groups having in the range of 5 up to 50 carbon atoms.

As used herein, the term "alkyl aryl" refers to an alkyl substituted with an aryl.

As used herein, heteroaryl refers to aromatic moieties containing one or more heteroatoms (e.g., N, O, S, or the like) as part of the ring structure and having in the range of 5 up to 50 total atoms in the ring structure (i.e., carbon atoms and heteroatoms).

As used herein, an organyl group refers to any organic substituent group, regardless of functional type, having one free valence at a carbon atom, e.g., $CH_3CH_2$-, $ClCH_2$—, $CH_3C(=O)$—.

As used herein, polyol refers to a compound containing more than one hydroxyl group (OH).

The β-hydroxysulfide moiety or β-hydroxythioether linkage of formula 1 can be a reaction product of a multifunctional glycidyl ether and a multifunctional mercapto compound. The multifunctional mercapto compound can be used singly or as a mixture of multifunctional mercapto compounds, and amines or phenolics can also be used together with the multifunctional mercapto compound.

The multifunctional glycidyl ether can be an aromatic polyol glycidyl ether, which can be utilized singly or in any combination. The aromatic polyol glycidyl ether can be, for example, 1-phenyl-1,2-ethanediol diglycidyl ether, 1,2-benzenediol diglycidyl ether (pyrocatechol diglycidyl ether), 1,3-benzenediol diglycidyl ether (resorcinol diglycidyl ether), 1,4-benzenediol diglycidyl ether, methyl catechol diglycidyl ether, methyl resorcinol diglycidyl ether, 1,2,4-benzenetriol triglycidyl ether, 2-hydroxybenzylalcohol diglycidyl ether, 3-hydroxybenzylalcohol diglycidyl ether, 4-hydroxybenzylalcohol diglycidyl ether, 3,5-dihydroxybenzylalcohol diglycidyl ether, 1,2-benzenedimethanol diglycidyl ether, 1,3-benzene-dimethanol diglycidyl ether, 1,4-benzene-dimethanol diglycidyl ether, 2-(2-hydroxyphenyl)ethanol diglycidyl ether, 2-(3-hydroxy-phenyl)-ethanol diglycidyl ether, 2-(4-hydroxy-phenyl)ethanol diglycidyl ether, or 2-phenyl-1,2-propanediol diglycidyl ether.

The multifunctional glycidyl ether can also be a novolac polyglycidyl ether (a glycidyl ether product of a novolac resin). The novolac polyglycidyl ether that can be utilized singly or in any combination. The novolac polyglycidyl ether can be, for example, a formaldehyde-phenol novolac polyglycidyl ether, a formaldehyde-substituted phenol novolac polyglycidyl ether, a formaldehyde-catechol novolac polyglycidyl ether, a formaldehyde-substituted catechol novolac polyglycidyl ether, a formaldehyde-resorcinol novolac polyglycidyl ether, a formaldehyde-substituted resorcinol novolac polyglycidyl ether, a formaldehyde-1,4-benzenediol novolac polyglycidyl ether, a formaldehyde-substituted 1,4-benzene diol novolac polyglycidyl ether, a formaldehyde-1,2,4-benzene-triol novolac polyglycidyl ether, a formaldehyde-bisphenol A novolac polyglycidyl ether, a formaldehyde-bisphenol AP novolac polyglycidyl ether, a formaldehyde-bisphenol F novolac polyglycidyl ether, a formaldehyde-bisphenol M novolac polyglycidyl ether, a formaldehyde-bisphenol P novolac polyglycidyl ether, a formaldehyde-bisphenol S novolac polyglycidyl ether, or a formaldehyde-bisphenol Z novolac polyglycidyl ether.

The novolac polyglycidyl ether can be produced by an aldehyde and a phenolic compound. The aldehyde used to produce the novolac resin can be, for example, formaldehyde. The phenolic compound used to produce the novolac resin can be any phenolic compound capable of undergoing a condensation reaction with an aldehyde. The phenolic compound can be, for example, phenol, a substituted phenol, catechol (pyrocatechol), a substituted catechol, resorcinol, a substituted resorcinol, 1,4-benzenediol, a substituted 1,4-benzene diol, 1,2,4-benzenetriol, bisphenol A, bisphenol AP, bisphenol F, bisphenol M, bisphenol P, bisphenol S, bisphenol Z, or any combination thereof.

Within the substituted phenolic compound portion of the novolac resin, the substitutes can preferably be a $C_1$ to $C_{20}$ organyl group, a $C_1$ to $C_{20}$ hydrocarbyl group, a halide atom, or any combination thereof.

The multifunctional glycidyl ether can also be a cyclic polyol glycidyl ether, which can be utilized singly or in any combination thereof. The cyclic polyol glycidyl ether can be, for example, 1,2-cyclopentanediol diglycidyl ether, 1,3-cyclopentanediol diglycidyl ether, 1,2-cyclohexanediol diglycidyl ether, 1,3-cyclohexanediol diglycidyl ether, 1,4-cyclohexanediol diglycidyl ether, 1,2-cyclohexanedimethanol diglycidyl ether, 1,4-cyclohexanedimethanol diglycidyl ether, bis(4-hydroxycyclohexyl)-methane diglycidyl ether, or 2,2-bis(4-hydroxy-cyclo-hexyl)-propane diglycidyl ether.

The multifunctional glycidyl ether can also be an aliphatic polyol glycidyl ether, which can be utilized singly or in any combination thereof. The aliphatic polyol glycidyl ether can be, for example, ethylene glycol diglycidyl ether, diethylene glycol diglycidyl ether, triethylene glycol diglycidyl ether, tetraethylene glycol diglycidyl ether, tripropylene glycol diglycidyl ether, diglycidyl ethers of polyethylene glycols with a molecular weight of from 106 to 8500, diglycidyl ethers of polyethylene glycols with a molecular weight of from 400 to 2000, 1,2-propanediol diglycidyl ether, 1,3-propanediol diglycidyl ether, 1,2-butanediol diglycidyl ether, 1,3-butanediol diglycidyl ether, 1,4-butanediol diglycidyl ether, 1,5-pentanediol diglycidyl ether, neopentyl glycol diglycidyl ether, 1,2-hexanediol diglycidyl ether, 1,6-hexanediol diglycidyl ether, 1,2-cyclohexanediol diglycidyl ether, 1,4-cyclohexanediol diglycidyl ether, 1,2-octanediol diglycidyl ether, 1,8-octanediol diglycidyl ether, 1,2-decanediol diglycidyl ether, 1,10-decanediol diglycidyl ether, glycerol triglycidyl ether, 2,2-dimethylolpropane diglycidyl ether, trimethylolethane triglycidyl ether, trimethylolpropane diglycidyl ether, pentaerythritol tetraglycidyl ether, dipentaerythritol tetraglycidyl ether, dipentaerythritol hexaglycidyl ether, sorbitol tetraglycidyl ether, sorbitol hexaglycidyl ether, 1,2,4-butanetriol triglycidyl ether, 2,2,4-trimethyl-1,3-pentanediol triglycidyl ether, propylene glycol diglycidyl ether, PEG diglycidyl ether or combinations thereof. The aliphatic polyol glycidyl ether can also be a polyglycidyl ether of an ethoxylate, a propoxylate, or a polyglycidyl ether of a mixed ethoxylate/propoxylate of a polyol or mixture of a polyols. The aliphatic polyol glycidyl ethers can also be a polyglycidyl ether of a polyol ethoxylate product containing from 2 to 400 mol of ethylene oxide per mole of polyol.

In some applications, the multifunctional glycidyl ether is selected from the group consisting of 1-phenyl-1,2-ethanediol diglycidyl ether, 1,2-benzenediol diglycidyl ether (pyrocatechol diglycidyl ether), 1,3-benzenediol diglycidyl ether (resorcinol diglycidyl ether), 1,4-benzenediol diglycidyl ether, methyl catechol diglycidyl ether, triglycidyl-p-aminophenol, diglycidyl 1,2-cyclohexanedicarboxylate, methyl resorcinol diglycidyl ether, 1,2,4-benzenetriol triglycidyl ether, 2-hydroxybenzylalcohol diglycidyl ether, 3-hydroxybenzylalcohol diglycidyl ether, diglycidyl phthaloyl diester, diglycidyl terephthaloyl diester, diglycidyl isophthaloyl diester, 3,4-epoxycyclohexylmethyl-3,4-epoxycyclohexane carboxylate, tris(2,3-epoxypropyl) isocyanurate, tetraphenylolethane glycidyl ether, Tetrad-X® (N,N,N',N'-tetraglycidyl-m-xylenediamine), meta-xylylene-tetraglycidyl amine, 4,4'-methylenebis(N,N-diglycidylaniline), 4-hydroxybenzylalcohol diglycidyl ether, 1,4-cyclohexanedimethanol-diglycidyl ether, mix of cis/trans, 3,5-dihydroxybenzylalcohol diglycidyl ether, Novolac Epoxy Resins (CAS#: 158163-01-0), 1,2-benzenedimethanol diglycidyl ether, 1,3-benzene-dimethanol diglycidyl ether, 1,4-benzene-dimethanol diglycidyl ether, tris(4-hydroxyphenyl)methane triglycidyl ether, 2-(2-hydroxyphenyl)ethanol diglycidyl ether, 2-(3-hydroxy-phenyl)-ethanol diglycidyl ether, 2-(4-hydroxy-phenyl)ethanol diglycidyl ether, 2-phenyl-1,2-propanediol diglycidyl ether, and biphenyl-4,4'-diglycidyl ether.

In some applications, the multifunctional glycidyl ether is preferably resorcinol diglycidyl ether.

The multifunctional mercapto compound can be, for example, 2,5-dimercapto-1,3,4-thiadiazole, alkyl 2,5-dimercapto-1,3,4-thiadiazole, 5,5-dithiobis(1,3,4-thiadiazole-2(3H)-thione, 2-amino-5-mercapto-1,3,4-thiadiazole, 2-mercapto-5-methylthio-1,3,4-thiadiazole, 5-methyl-1,3,4-thiadiazole-2-thiol, dimercaptothiadiazole dimer (available from Vanderbilt chemical as VanLube® 829), 1-methyl, 2,3-dimercaptobenzene, 1,2-dimercaptoethane, trimethylolpropane trithioglycolate, pentaerythritol tetrathioglycolate, dipentaerythritol hexathioglycolate, 1,2-ethanedithiol, 1,2-propane-dithiol, 1,3-propanedithiol, 1,10-decanedithiol, dipentene dimercaptan, ethylcyclohexyl dimercaptan, 1,4-benzenedithiol, 1,3-benzenedithiol, 1,2-benzenedithiol, or combinations of two or more thereof.

In some applications, a mixture of one or more of the multifunctional mercapto compounds can be utilized.

In some applications, one or more multifunctional mercapto compounds mixed with one or more amines, phenolics and/or carboxylic acids can be utilized.

In a preferred application, the multifunctional mercapto compound is dimercaptothiadiazole.

Conventional oxygen barrier systems would require preparing and applying a barrier coating in water, organic solvent or a water/solvent mixture to a polyethylene terephthalate (PET), Nylon, polyethylene (PE) or oriented polypropylene (OPP) film by a flexo or gravure process, followed by drying. After drying, an adhesive is applied and then a second film is laminated to the adhesive with a twin-rolled adhesive laminator. The adhesive is then cured at an appropriate time and temperature, e.g. that recommended by the adhesive manufacturer.

In one application, a single layer of the resin including a compound of formula 1 could be applied in water, solvent or a water/solvent mixture to a PET, Nylon, PE or OPP film by a flexo or gravure process, and then dried. This would eliminate a layer (adhesive) and correspondingly save materials, cycle time, equipment and energy. The resin including a compound of formula 1 can be used to formulate coatings that can be used as one-component, thus eliminating a layer (the barrier coating and adhesive are contained in a single layer). The need to post-cure the laminating adhesive is also mitigated, thus providing faster processing times and energy savings. The solvent for dissolving or diluting the resin can be the same or different from the solvent for the reaction.

The reaction of the multifunctional glycidyl ether and the multifunctional mercapto compound can occur in the presence of a solvent. The reaction can also be performed in the substantial absence of a solvent. The reaction can occur at a temperature of 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., or 160° C.

The solvent can be aromatic hydrocarbons, aliphatic hydrocarbons, organic alcohols, organic ethers, organic carbonates, organic esters, halogenated aliphatic hydrocarbons, aromatic hydrocarbons, halogenated aromatic hydrocarbons, and combinations thereof. Aliphatic hydrocarbons, which may be useful as a solvent, include $C_4$ to $C_{20}$ hydrocarbons, or alternatively, $C_5$ to $C_{10}$ hydrocarbons, and may be cyclic or acyclic and include linear or branched isomers, unless otherwise specified. Non-limiting examples of suitable acyclic aliphatic solvents include pentane, hexane, heptane, octane, and combinations thereof. Non-limiting examples of suitable cyclic aliphatic solvents include cyclohexane, methyl cyclohexane, and combinations thereof. Aromatic hydrocarbons, which may be useful as a solvent, include $C_6$ to $C_{20}$ aromatic hydrocarbons; or alternatively, $C_6$ to $C_{10}$ aromatic hydrocarbons. Non-limiting examples of suitable aromatic hydrocarbons include benzene, toluene, xylene (including ortho-xylene, meta-xylene, para-xylene, or mixtures thereof), and ethylbenzene, or combinations thereof. Organic alcohols, organic ethers, organic carbonates, organic esters, which may be useful as a solvent include $C_2$ to $C_{20}$ organic alcohols, organic ethers, organic carbonates, organic esters, organic ketones, or organic aldehydes; alternatively, $C_2$ to $C_{10}$ organic alcohols, organic ethers, organic carbonates, organic esters, organic ketones, or organic aldehydes; or alternatively, $C_2$ to $C_5$ organic alcohols, organic ethers, organic carbonates, organic esters, organic ketones, or organic aldehydes. Non-limiting examples of suitable alcohol solvents include methanol, 1-propanol, 2-propanol, 1-butanol, 2-butanol, 2-methyl-2-propanol, or mixtures thereof.

Suitable ether solvents may be cyclic or acyclic. Non-limiting examples of suitable ethers which may be useful as a solvent include dimethyl ether, diethyl ether, methyl ethyl ether, monoethers or diethers of glycols (e.g., dimethyl glycol ether), furans, substituted furans, dihydrofuran, substituted dihydrofurans, tetrahydrofuran (THF), substituted tetrahydrofurans, tetrahydropyrans, substituted tetrahydropyrans, 1,3-dioxanes, substituted 1,3-dioxanes, 1,4-dioxanes, substituted 1,4-dioxanes, or mixtures thereof. In an application, each substituent of a substituted furan, substituted dihydrofuran, substituted tetrahydrofuran, substituted tetrahydropyran, substituted 1,3-dioxane, or substituted 1,4-dioxane, can be a $C_1$ to $C_5$ alkyl group. Non-limiting examples of suitable organic carbonates, which may be utilized as a solvent, include ethylene carbonate, propylene carbonate, diethyl carbonate, diethyl carbonate, and combinations thereof. Non-limiting examples of suitable esters, which may be utilized as a solvent, include ethyl acetate, propyl acetate, butyl acetate, isobutyl isobutyrate, and combinations thereof. Halogenated aliphatic hydrocarbons, which may be useful as a solvent, include $C_1$ to $C_{15}$ halogenated aliphatic hydrocarbons; alternatively, $C_1$ to $C_{10}$ halogenated aliphatic hydrocarbons; or alternatively, $C_1$ to $C_5$ halogenated aliphatic hydrocarbons. Non-limiting examples of such halogenated aliphatic hydrocarbons, which may be utilized as a solvent, include carbon tetrachloride, chloroform, methylene chloride, dichloroethane, trichloroethane, and combinations thereof. Halogenated aromatic hydrocarbons, which may be useful as a solvent, include $C_6$ to $C_{20}$ halogenated aromatic hydrocarbons; or alternatively, $C_6$ to $C_{10}$ halogenated aromatic hydrocarbons. Non-limiting examples of suitable halogenated aromatic hydrocarbons include chlorobenzene, dichlorobenzene, and combinations thereof.

In one application, the solvents will have a relative evaporation greater than 0.1 compared to butyl acetate and preferably greater than 0.5. For example, the solvent can be propylene glycol methyl ether (Dowanol® PM) which has an evaporation rate of 0.6 vs. butyl acetate.

The oxygen barrier coating compositions including the resins of the present invention may optionally be mixed with fillers, colorants/pigments, or extenders, such as clays, talcs, silicas or other inorganic particles.

The fillers used in the oxygen barrier coating compositions can be clay. Preferably, the clay is nanoparticulate. Also preferably, a portion of the clay mineral has been intercalated or exfoliated during the dispersion process. There is no restriction on the type of clay used in this invention provided it is sufficiently dispersible in an aqueous medium and that it is capable of being intercalated or exfoliated during dispersion. In an exfoliated form the aspect ratio of the clay (i.e. the ratio between the length and thickness of a single clay "sheet") will have an impact on the level of oxygen barrier achieved. The greater the aspect ratio, the more the rate of oxygen diffusion through the dry coating and laminate will be reduced. Clay minerals with aspect ratios between 20 and 10,000 are preferably used. Particularly preferred are those minerals having an aspect ratio greater than 100. Examples of suitable clays include kaolinite, montmorillonite, attapulgite, illite, bentonite, halloysite, kaolin, mica, diatomaceous earth and fuller's earth, calcined aluminium silicate, hydrated aluminium silicate, magnesium aluminium silicate, sodium silicate and magnesium silicate. Commercial examples of suitable materials include Cloisite® Na+ (available from Southern Clay Products, Inc., Gonzales, Tex.) and Bentone® ND (available from Elementis, East Windsor, N.J.).

Although the primary application is for transparent gas barrier coatings, colorants may be added to the formulation to provide a colored gas barrier and optionally make it translucent or even opaque. Most presses have multiple print stations which are used for some of the process or spot colors. Even the most recent flexographic presses have a limited number of stations (up to 12) and often there wouldn't be a spare station to apply the gas barrier coating in-line. One option would be to use the station dedicated to the white background color, which is typically applied in full coverage, and replace it with a white gas barrier coating. To do so, the resins of the present invention could be mixed with white pigments such as anatase or rutile titanium dioxide and/or potential alternatives including calcium carbonate, barites (barium sulfate), zinc sulfide, lithopone, aluminum trihydroxide, kaolin clay, magnesium silicate and combinations therefrom. Spacers such as calcium carbonates and silicates may be used in combination to space the primary white pigment (typically $TiO_2$) and improve the hiding power.

Suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

Note also that fine particle white pigments or fillers (such as calcium carbonates) may be used as anti-blocking agent to counteract the blocking effect of the resin/coating when necessary.

The gas barrier coatings of the present invention can include nanocomposite clays, such as swellable inorganic clay or organoclay. Swellable layered inorganic clay materials suitable for inclusion in the gas barrier coatings provided herein include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydro talcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{2+}$ $K^+$ or $Mg^{2+}$ present at the interlayer surfaces.

The layered clay can also be intercalated and exfoliated by treatment with organic molecules (swelling or exfoliating "agents" or "additives") capable of undergoing ion exchange reactions with the cations present at the interlayer surfaces of the layered silicate. Suitable exfoliating additives include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides and cationic polymers including polydiallylammonium chloride, amine functional acrylics, including but not limited to those containing dimethylaminomethacrylate or copolymers thereof, amine functional epoxy resins and polyurethanes and polyethyleneimine. Desirable amine compounds (or the corresponding ammonium ion) are those with the structure $R_aR_bR_cN$, where Ra, $R_b$, and $R_c$ are $C_1$ to $C_{30}$ alkyls or alkenes in one application, $C_1$ to $C_{30}$ alkyls or alkenes in another application, which may be the same or different.

The exfoliating agent can also be a diamine compound (or the corresponding ammonium or diammonium ion), such as diaminoalkane, N-alkyl-diamino-alkane, N,N-dialkyl-diaminoalkyl, N,N,N'-trialkyl-diaminoalkane, N,N,N',N'-tetraalkyl-diaminoalkane, or the like. Desirable diamines can have the structure $R_dR_eNR_fNR_gR_h$, where $R_d$, $R_e$, $R_f$, $R_g$ and $R_h$ are $C_1$ to $C_{30}$ alkyls or alkenes in one application, $C_1$ to $C_{30}$ alkyls or alkenes in another application, which may be the same or different. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, N,N,N'-trimethyl-N'-tallow-1,3-diaminopropane, and so on.

Another class of exfoliating additives include those which can be covalently bonded to the interlayer surfaces. These include polysiloxanes of the structure $—SiR_9R_{10}$ where $R_9$ is the same or different at each occurrence and is selected from alkyl, alkoxy or oxysilane and $R_{10}$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885, as well as WO92/02582.

In some applications, the exfoliating additive or additives are capable of reaction with the halogen sites on the interpolymer to form complexes which help exfoliate the clay. In some applications, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallow-alkyl-methylamine and the like, and amine-terminated polytetrahydrofuran; long-chain thiol and thiosulfate compounds like hexamethylene sodium thiosulfate.

The exfoliating additive is optionally present in the composition in an amount to achieve optimal air retention as measured by the permeability testing described herein. For example, the additive may be present from 0.1 to 70 weight %, preferably from 0.2 to 15 weight %, and more preferably from 0.3 to 10 weight %. The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another application.

Like printing inks, other additives, alone or in combination, may be employed to enhance various properties, including but not limited to, waxes, ammonia, defoamers, dispersants, stabilizers, silicones, rheological modifiers, plasticizers, adhesion promoters, light stabilizers, de-gassing additives, flow promoters, defoamers, antioxidants, UV stabilizers, surfactants, and the like.

The oxygen barrier coating compositions of the present invention have excellent oxygen barrier properties at elevated relative humidity, for example, 50-100% relative humidity. The oxygen barrier coating compositions can be applied to a substrate, and then dried. The oxygen transmission rate of oxygen barrier coating compositions can be measured by a known method. Exemplary methods include measuring the oxygen permeability using an oxygen transparency coefficient measurement device to measure the oxygen permeation coefficient at a specific relative humidity. The coating weights of oxygen barrier coating compositions can also be measured by any known method. Exemplary methods include measuring the total weight of the dried oxygen barrier coating composition on one square meter of a substrate. In some applications, the dry coating weight of the oxygen barrier coating can be applied at any appropriate dry coating weight, such as less than 5 grams per square meter, or about 2 grams per square meter, or less than 2 grams per square meter, or less than 1.5 grams per square meter, or less than 1 gram per square meter.

In some applications, the oxygen barrier coating compositions have an oxygen transmission rate of between about 0.05 cc/m$^2$-day to about 50 cc/m$^2$-day at a relative humidity of 50% or more. In some applications, the oxygen barrier coating compositions have an oxygen transmission rate of between about 0.5 cc/m$^2$-day to about 25 cc/m$^2$-day at a relative humidity of 50% or more. In some applications, the oxygen barrier coating compositions have an oxygen transmission rate of between about 1 cc/m$^2$-day to about 15 cc/m$^2$-day at a relative humidity of 50% or more.

In some applications, the use environment of the gas barrier coating has a relative humidity is 75%.

In some applications, the oxygen barrier coating compositions have a coating weight of less than about 2 grams per square meter.

In some applications, the oxygen barrier coating compositions have an oxygen transmission rate of less than about 35 cc/m$^2$-day at a relative humidity of 75%, and a coating weight of less than about 2 grams per square meter. In some applications, the oxygen barrier coating compositions have an oxygen transmission rate of less than about 30 cc/m$^2$-day at a relative humidity of 75%, and a coating weight of less than about 2 grams per square meter. In some applications, the oxygen barrier coating compositions have an oxygen transmission rate of less than about 25 cc/m$^2$-day at a relative humidity of 75%, and a coating weight of less than about 2 grams per square meter. In some applications, the oxygen barrier coating compositions have an oxygen transmission rate of less than about 20 cc/m$^2$-day at a relative humidity of 75%, and a coating weight of less than about 2 grams per square meter. In some applications, the oxygen barrier coating compositions have an oxygen transmission rate of less than about 15 cc/m$^2$-day at a relative humidity of 75%, and a coating weight of less than about 2 grams per square meter. In some applications, the oxygen barrier coating compositions have an oxygen transmission rate of less than about 10 cc/m$^2$-day at a relative humidity of 75%, and a coating weight of less than about 2 grams per square meter. In some applications, the oxygen barrier coating compositions have an oxygen transmission rate of between 0.05 cc/m-day to about 5 cc/m$^2$-day at a relative humidity of 75%, and a coating weight of less than about 2 grams per square meter.

EXAMPLES

The following examples illustrate specific aspects of the present invention and are not intended to limit the scope thereof in any respect and should not be so construed.

Examples 1-7

General Polymer Synthesis

The procedure for synthesizing epoxy resins was to add co-reactant (mercapto containing or non-mercapto containing compound) and Dowanol® PM to a round bottom flask fitted with an addition funnel and a reflux condenser under a stream of dry N$_2$. The sample was then heated to 90° C. using a heating mantle controlled by a thermal watch. Diglycidyl ether was then added via the addition funnel over 20-30 minutes followed by a rinse of Dowanol® PM. The reaction exothermed up to 120° C. and was then held for 2.5 hours at 120° C.

TABLE 1

General Polymer Synthesis

| Resin Examples | Diglycidul Ether | Wt. Diglycidyl Ether (g) | Co-reactant | Wt. Co-reactant (g) | Wt. Dowanol PM (g) |
|---|---|---|---|---|---|
| 1 | RDGE | 47 | DMBPC | 31 | 136 |
| 2 | RDGE | 35 | DMTD | 26 | 46 |
| 3 | RDGE | 42 | DMTD + Piperazine | 27 + 7 | 52 |
| 4 | BiFDGE | 56 | DMTD | 30 | 59 |
| 5 | RDGE | 35 | DMTD | 44 | 55 |
| 6 | THPMTGE | 19.7 | DMTD | 19.2 | 74.3 |
| 7 | RDGE | 68 | Piperazine | 35 | 48 |
| 8 | NPGDE | 39 | DMTD | 30 | 47 |
| 9 | BPADGE | 42 | BPA | 32 | 52 |

RDGE = resorcinol diglycidyl ether
NPGDE = neopentylglycol diglycidyl ether
BiFDGE = Bisphenol F diglycidyl ether
DMTD = dimercaptothiadiazole
DMBPC = Dimethylbisphenolcyclohexane
BPA = Bisphenol A
BPADGE = Bisphenol A diglycidyl ether
THPMTGE = tris(4-hydroxyphenyl)methane triglycidyl ether Examples 10-18

Finished Coatings

The polymers prepared in Examples 1-9 were diluted to 30% solids using added solvent to produce finished coatings and then drawn down using a 1K bar on a Model 101 K-coater (Testing Machines, Inc., New Castle, Del.) on a 48 gauge SP65 polyethylene terephthalate film (a 1K bar deposits a 6 micron wet film on a substrate). The film was dried for 15 seconds at 80° C. and has a weight of about 1.8 grams per square meter. The oxygen transmission rate (OTR) was then measured on a Mocon Model 2/21Oxtran at 50% or 75% RH. The OTR data (cc/m$^2$-day) is shown in Table 3.

TABLE 2

Finished Coatings

| Coating Examples | Resin Examples | Wt. Table 1 Polymer (g) | Added Solvent | Added Solvent (g) |
|---|---|---|---|---|
| EVOH[1] (Control) | Kuararay AQ04104[3] | 8.0 | Water/Isopropanol | 87.0/5.0 |
| 10 (Inventive) | 1 | 5.0 | None | 0.0 |
| 11 (Inventive) | 2 | 4.0 | Tetrahydrofuran | 1.0 |
| 12 (Inventive) | 3 | 2.4 | Tetrahydrofuran | 2.1 |
| 13 (Inventive) | 4 | 3.2 | Tetrahydrofuran | 3.1 |
| 14 (Inventive) | 5 | 4.0 | Tetrahydrofuran | 4.0 |
| 15 (Inventive) | 6 | 8.0 | Dowanol PM | 1.33 |
| 16 (Comparative) | 7 | 9.4 | Isopropanol | 12.5 |
| 17 (Comparative) | 8 | 2.4 | Tetrahydrofuran | 2.4 |
| 18[2] (Comparative) | 9 | 2.5 | Tetrahydrofuran | 2.7 |

[1]EVOH was chosen as the control resin since it may be used in barrier coatings.
[2]Example 18 can also be viewed as a control as it is based on traditional raw materials used in barrier coatings.
[3]Excelval ® AQ-4104 by Kuraray (fully hydrolyzed ethylene- vinyl alcohol co-polymer).

TABLE 3

| Coating Examples | OTR @ 50% RH | OTR @ 75% RH |
|---|---|---|
| EVOH (Control) | 7 | 75 |
| 10 (Inventive) | | 71 |
| 11 (Inventive) | 8 | 11 |
| 12 (Inventive) | 27 | 35 |
| 13 (Inventive) | 43 | 61 |
| 14 (Inventive) | | 6.9 |
| 15 (Inventive) | | 28 |
| 16 (Comparative) | 53 | 95 |
| 17 (Comparative) | | 106 |
| 18 (Comparative) | | 91 |

OTR: Oxygen Transmission Rate (25 cc/m²-day). RH: Relative Humidity.

Table 3 shows the following:

Examples 10 and 16 show that a bisphenol (DMBC) and an amine reactant (piperazine) are not nearly as effective for OTR as DMTD.

The OTR of the coating made from RDGE and DMTD (Example 11) is nearly 7 times lower than the EVOH control at 75% RH.

Example 12 shows that a mixture of piperazine and DMTD yields moderate OTR results. However, there may be advantages in such a mixed resin such as improved interactions with fillers such as exfoliated nanoclays.

Example 13 shows the OTR of coating made from another aromatic bisphenol (BiFDGE) and DMTD is 43 cc/m²-day at 50% RH and 61 cc/m²-day at 75% RH.

Example 14 shows the OTR of coating made from RDGE and DMTD is 6.9 cc/m²-day at 75% RH.

Example 15 shows the OTR of coating made from THP-MTGE and DMTD is 28 cc/m²-day at 75% RH.

Example 17 shows that an aliphatic diglycidyl ether (NPGDGE) gives poor OTR performance compared to RDGE Example 18, which is another control, is shown to have poor OTR compared to the coatings of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An oxygen barrier coating composition comprising:
   a) a polymer including a β-hydroxythioether linkage of the following formula:

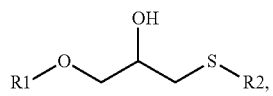

wherein:
R1 is an alkyl, cycloalkyl, aryl, alkyl aryl, glycol or polyol group, wherein the alkyl, cycloalkyl, aryl, alkyl aryl, glycol or polyol group is substituted with one or more glycidyl groups, wherein the alkyl group of R1 is optionally further substituted with one or more OH, cycloalkyl, aryl, heteroaryl or glycidyl ether groups or combinations thereof, and the cycloalkyl, aryl, alkyl aryl, glycol or polyol group of R1 optionally further is substituted with one or more alkyl, OH, cycloalkyl, aryl, heteroaryl or glycidyl ether groups or combinations thereof; and R2 is an alkyl, cycloalkyl, aryl, alkyl aryl or heteroaryl group, wherein the alkyl, cycloalkyl, aryl, alkyl aryl or heteroaryl group of R2 is substituted with one or more mercapto groups, wherein the aryl, alkyl aryl, alkyl, cycloalkyl or heteroaryl group optionally further is substituted with one or more alkyl, OH, cycloalkyl, aryl, heteroaryl or glycidyl ether groups or combinations thereof, wherein the polymer including the β-hydroxythioether linkage is a reaction product of a multifunctional glycidyl ether and a multifunctional mercapto compound; and b) water, or a solvent selected from the group consisting of aliphatic hydrocarbons, organic alcohols, organic ethers, organic carbonates, organic esters, halogenated aliphatic hydrocarbons, and combinations thereof.

2. The oxygen barrier coating composition of claim 1, wherein R1 is an aryl group substituted with 1 to 14 glycidyl groups.

3. The oxygen barrier coating composition of claim 1, wherein R2 is an aryl group or a heteroaryl group, the aryl and heteroaryl groups being substituted with 1 to 15 mercapto groups.

4. The oxygen barrier coating composition of claim 1, wherein the oxygen barrier coating composition dried on a substrate at a coating weight of less than about 2 grams per square meter has an oxygen transmission rate of from about 0.05 cc/m²-day to about 50 cc/m²-day at a relative humidity of 50% or more.

5. The oxygen barrier coating composition of claim 4, wherein the oxygen transmission rate is from about 0.5 cc/m²-day to about 25 cc/m²-day at a relative humidity of 50% or more.

6. The oxygen barrier coating composition of claim 4, wherein the oxygen transmission rate is from about 1 cc/m²-day to about 15 cc/m²-day at a relative humidity of 50% or more.

7. The oxygen barrier coating composition of claim 4, wherein the oxygen barrier coating composition has a coating weight of less than about 1.5 grams per square meter.

8. The oxygen barrier coating composition of claim 1, wherein the oxygen barrier coating composition dried on a substrate at a coating weight of less than about 2 grams per square meter has an oxygen transmission rate of less than about 35 cc/m²-day at a relative humidity of 75%.

9. The oxygen barrier coating composition of claim 8, wherein the oxygen transmission rate is less than about 10 cc/m²-day at a relative humidity of 75%.

10. The oxygen barrier coating composition of claim 1, wherein the multifunctional glycidyl ether is selected from the group consisting of 1-phenyl-1,2-ethanediol diglycidyl ether, 1,2-benzenediol diglycidyl ether (pyrocatechol diglycidyl ether), 1,3-benzenediol diglycidyl ether (resorcinol diglycidyl ether), 1,4-benzenediol diglycidyl ether, methyl catechol diglycidyl ether, triglycidyl-p-aminophenol, diglycidyl 1,2-cyclohexanedicarboxylate, methyl resorcinol diglycidyl ether, 1,2,4-benzenetriol triglycidyl ether, 2-hydroxybenzylalcohol diglycidyl ether, 3-hydroxybenzylalcohol diglycidyl ether, diglycidyl phthaloyl diester, diglycidyl terephthaloyl diester, diglycidyl isophthaloyl diester, 3,4-epoxycyclohexylmethyl-3,4-epoxycyclohexane carboxylate, tetraphenylolethane glycidyl ether, meta-xylylenetetraglycidyl amine, 4-hydroxybenzyl-alcohol diglycidyl ether, 1,4-cyclohexanedimethanol-diglycidyl ether, mix of cis/trans, 3,5-dihydroxybenzylalcohol diglycidyl ether, Novolac Epoxy Resins, 1,2-benzene-dimethanol diglycidyl ether, 1,3-benzene-dimethanol diglycidyl ether, 1,4-benzene-dimethanol diglycidyl ether, tris(4-hydroxyphenyl) methane triglycidyl ether, 2-(2-hydroxyphenyl)ethanol diglycidyl ether, 2-(3-hydroxy-phenyl)-ethanol diglycidyl ether, 2-(4-hydroxy-phenyl)ethanol diglycidyl ether, 2-phenyl-1,2-propanediol diglycidyl ether, propylene glycol diglycidyl ether, polyethylene glycol diglycidyl ether and biphenyl-4,4'-diglycidyl ether.

11. The oxygen barrier coating composition of claim 1, wherein the multifunctional mercapto compound is selected from the group consisting of 2,5-dimercapto-1,3,4-thiadiazole, alkyl 2,5-dimercapto-1,3,4-thiadiazole, 5,5-dithiobis(1,3,4-thiadiazole-2(3H)-thione, 2-amino-5-mercapto-1,3,4-thiadiazole, 2-mercapto-5-methyl-thio-1,3,4-thiadiazole, 5-methyl-1,3,4-thiadiazole-2-thiol, dimercaptothiadiazole dimer, 1-methyl, 2,3-dimercaptobenzene, 1,2-dimercaptoethane, trimethylolpropane trithio-glycolate, pentaerythritol tetrathioglycolate, dipentaerythritol hexathioglycolate, 1,2-ethanedithiol, 1,2-propanedithiol, 1,3-propanedithiol, 1,10-decanedithiol, dipentene dimercaptan, ethylcyclohexyl dimercaptan, 1,4-benzenedithiol, 1,3-benzenedithiol, and 1,2-benzenedithiol.

12. A package for food, pharmaceuticals or cosmetics comprising the oxygen barrier coating composition of claim 1.

13. A method of reducing the oxygen transmission rate of a substrate, comprising:
applying the oxygen barrier coating composition of claim 1 on the substrate, and
drying the oxygen barrier coating composition.

14. The method of claim 13 further comprising measuring the oxygen transmission rate of the oxygen barrier coating composition.

15. A method of coating a substrate with an oxygen barrier coating composition comprising:
a) providing an oxygen barrier coating composition comprising:
i) a polymer that includes a β-hydroxythioether linkage of the following formula:

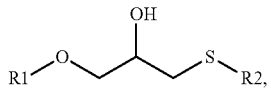

wherein:
R1 is an alkyl, cycloalkyl, aryl, alkyl aryl, glycol or polyol group, wherein the alkyl, cycloalkyl, aryl, alkyl aryl, glycol or polyol group is substituted with one or more glycidyl groups, wherein the alkyl group of R1 is optionally further substituted with one or more OH, cycloalkyl, aryl, heteroaryl or glycidyl ether groups or combinations thereof, and the cycloalkyl, aryl, alkyl aryl, glycol or polyol group of R1 optionally further can be substituted with one or more alkyl, OH, cycloalkyl, aryl, heteroaryl or glycidyl ether groups or combinations thereof, wherein the polymer including the β-hydroxythioether linkage is a reaction product of a multifunctional glycidyl ether and a multifunctional mercapto compound; and R2 is an alkyl, cycloalkyl, aryl group or a heteroaryl group, wherein the alkyl, cycloalkyl, aryl group or heteroaryl group of R2 is substituted with one or more mercapto groups, wherein the aryl, alkyl aryl, alkyl, cycloalkyl or heteroaryl group optionally can be further substituted with one or more alkyl, OH, cycloalkyl, aryl, heteroaryl or glycidyl ether groups or combinations thereof; and ii) water, or a solvent selected from the group consisting of aliphatic hydrocarbons, organic alcohols, organic ethers, organic carbonates, organic esters, halogenated aliphatic hydrocarbons, and combinations thereof;

b) applying the oxygen barrier coating composition to the substrate; and
c) drying the oxygen barrier coating composition.

16. The method of claim 15, wherein R1 is an aryl group substituted with 1 to 14 glycidyl groups.

17. The method of claim 15, wherein R2 is an aryl group or a heteroaryl group, the aryl and heteroaryl groups being substituted with 1 to 15 mercapto groups.

18. The method of claim 15, wherein the oxygen barrier coating composition dried on a substrate at a coating weight of less than about 2 grams per square meter has an oxygen transmission rate of from about 0.05 cc/m$^2$-day to about 50 cc/m$^2$-day at a relative humidity of 50% or more.

19. The method of claim 18, wherein the oxygen transmission rate is from about 0.5 cc/m$^2$-day to about 25 cc/m$^2$-day at a relative humidity of 50% or more.

20. The method of claim 19, wherein the oxygen transmission rate is from about 1 cc/m$^2$-day to about 15 cc/m$^2$-day at a relative humidity of 50% or more.

21. The method of claim 15, wherein the oxygen barrier coating composition dried on a substrate at a coating weight of less than about 2 grams per square meter has an oxygen transmission rate of less than about 35 cc/m$^2$-day at a relative humidity of 75%.

22. The method of claim 21, wherein the oxygen transmission rate is less than about 10 cc/m$^2$-day at a relative humidity of 75%.

* * * * *